(12) United States Patent
Sams et al.

(10) Patent No.: US 7,931,719 B2
(45) Date of Patent: Apr. 26, 2011

(54) REVOLUTION VORTEX TUBE GAS/LIQUIDS SEPARATOR

(75) Inventors: Gary W. Sams, Tulsa, OK (US); Dan C. Porneala, Tulsa, OK (US)

(73) Assignee: National Tank Company, Houston, TX (US)

( * ) Notice: Subject to any disclaimer, the term of this patent is extended or adjusted under 35 U.S.C. 154(b) by 746 days.

(21) Appl. No.: 11/949,193

(22) Filed: Dec. 3, 2007

(65) Prior Publication Data

US 2009/0139192 A1  Jun. 4, 2009

(51) Int. Cl.
*B01D 45/12* (2006.01)
(52) U.S. Cl. .............. 55/348; 55/349; 55/456; 55/457
(58) Field of Classification Search .......... 55/342, 55/345, 348, 349, 434, 447, 456, 457, 459.1, 55/462; 96/301, 302, 304, 305, 321
See application file for complete search history.

(56) References Cited

U.S. PATENT DOCUMENTS

| | | | |
|---|---|---|---|
| 1,695,192 A * | 12/1928 | Kotzebue | 261/114.1 |
| 2,147,671 A * | 2/1939 | Pratt | 55/410 |
| 2,446,882 A * | 8/1948 | Morrison | 55/347 |
| 2,986,278 A * | 5/1961 | Bjorklund | 55/348 |
| 3,423,294 A * | 1/1969 | Sephton | 203/10 |
| 3,590,558 A * | 7/1971 | Fernandes | 55/338 |
| 3,895,930 A | 7/1975 | Campolong | |
| 3,930,816 A | 1/1976 | Miczek | |
| 3,988,132 A * | 10/1976 | Oranje | 55/399 |
| 4,309,283 A * | 1/1982 | Vikio et al. | 209/733 |
| 4,510,056 A * | 4/1985 | Frykhult et al. | 210/512.1 |
| 4,687,572 A | 8/1987 | Budzich | |
| 4,767,424 A * | 8/1988 | McEwan | 55/329 |
| 4,838,906 A | 6/1989 | Kiselev | |
| 4,985,058 A * | 1/1991 | Prinsloo et al. | 55/457 |
| 5,035,730 A * | 7/1991 | Kisaragi et al. | 55/434.4 |
| 5,129,931 A * | 7/1992 | Oranje | 55/399 |

(Continued)

FOREIGN PATENT DOCUMENTS

EP  436973 A2 *  7/1991

(Continued)

OTHER PUBLICATIONS

International Search Report and Written Opinion (PCT/US08/80707) issued by the International Searching Authority (ISA/US) on Feb. 3, 2009; 8 pgs.

(Continued)

*Primary Examiner* — Duane Smith
*Assistant Examiner* — Sonji Turner
(74) *Attorney, Agent, or Firm* — Gable Gotwals (57) ABSTRACT

A centrifugal separator for separating immiscible components of a wet gas stream is formed by an upright cylindrical vortex tube having an internal wall surface, a top with a gas outlet opening therein, a bottom providing a liquid outlet opening and a wet gas stream inlet tangential to the internal wall surface, the inlet being spaced below the top. A helical baffle is secured to the vortex tube internal wall surface and extends from below the top but above the inlet to a lower end spaced above the vortex tube bottom. A plurality of spaced apart vertical outlet fins are affixed to and extending radially from the internal wall surface adjacent the vortex tube bottom, each outlet fin having a top end spaced below the helical baffle lower end.

21 Claims, 8 Drawing Sheets

U.S. PATENT DOCUMENTS

| | | | | |
|---|---|---|---|---|
| 5,462,585 A | * | 10/1995 | Niskanen et al. | 95/261 |
| 5,570,744 A | | 11/1996 | Weingarten et al. | |
| 6,019,825 A | * | 2/2000 | Greene et al. | 96/209 |
| 6,576,029 B2 | | 6/2003 | West | |
| 6,673,135 B2 | | 1/2004 | West | |
| 6,709,500 B1 | | 3/2004 | West | |
| 6,977,004 B2 | * | 12/2005 | Sakakibara et al. | 55/396 |
| 7,001,448 B1 | | 2/2006 | West | |
| 7,279,020 B2 | * | 10/2007 | Christiansen et al. | 55/338 |
| 7,476,317 B2 | * | 1/2009 | Nassif | 210/512.1 |
| 7,780,766 B2 | * | 8/2010 | Thompson | 95/272 |
| 2003/0000186 A1 | * | 1/2003 | West | 55/459.1 |
| 2003/0150324 A1 | | 8/2003 | West | |
| 2005/0060970 A1 | | 3/2005 | Polderman | |

FOREIGN PATENT DOCUMENTS

| | | | |
|---|---|---|---|
| FR | 2780659 | * | 1/2000 |
| GB | 2409990 A | * | 7/2005 |

OTHER PUBLICATIONS

International Preliminary Report on Patentability issued by the International Bureau on Jun. 17, 2010 in PCT/US2008/080707 (7 pgs).

* cited by examiner

REVOLUTION VORTEX TUBE GAS/LIQUIDS SEPARATOR

REFERENCE TO PENDING APPLICATIONS

This application is not based upon any pending domestic or international patent applications.

BACKGROUND OF THE INVENTION

This disclosure is to a system and a method for separating entrained immiscible liquid components from a gas stream.

The subject of the invention generally relates to gas/liquid (2 phase) separators or gas/liquid/solid (3 phase) separators. The invention may also be practiced in which the liquid phase is a mixture of an aqueous phase and an organic or hydrocarbon phase. Separators of this type are typically process vessels that may be at atmospheric or above atmospheric pressure. The main function of the separator system of the invention is to segregate immiscible phases of a process stream. The process stream may be in the form of gas that carries with it an immiscible liquid component, frequently referred to as a "wet gas" stream. The function of the separator of this invention is to separate out the liquid component to provide at the output of the separator a "dry gas" stream, that is, a gas stream that is relatively free from entrained liquids.

The systems and methods of this disclosure are basically applicable to removing liquid dispersed in a gas stream, such as in which the liquid is of relatively little volume compared to the gas and in which the liquid may be primarily in the form of mist and removing gas from a liquid stream in which the gas may be of a relatively small proportion (by weight) of the stream. In the first instance the separation process is generally referred to as "gas demisting" and in the second instance the separation process is generally referred to as "liquid degassing".

Separators for separating liquid components from a gas stream are commonly utilized in the oil and gas industry, specifically in oil and gas production, oil refining and gas processing, and are also used in the mining industry, chemical plants, water treatment facilities, pulp and paper plants and pharmaceutical manufacturing facilities.

Separation of immiscible components of a wet gas stream usually depends on the force of gravity. Gravity can be either natural gravity, that is, the pull of mass towards the center of the earth or created (artificial) gravitational forces such as represented by centrifugal separators. Natural gravity is usually used by flowing a stream having immiscible components into a vessel which provides a quiescent zone, that is, a relatively undisturbed environment that allows gravity to act on heavier components of the stream and move them into a downward part of the vessel. This movement has the counteraction of the lighter components of the stream migrating to an upward part of the vessel. In this way, the heavier components, that is, liquids, can be withdrawn from the lower part of the vessel and the lighter components, that is, gases, withdrawn from an upper part of the vessel.

Separators commonly have an inlet momentum absorber or deflector to reduce the momentum of the incoming stream and to distribute liquid and gas within the separator vessel. This kinetic energy reduction initiates phase separation inside a separator vessel.

Artificial gravity can be generated by the use of a vortex tube or tubes. A vortex tube is typically an elongated tube having a cylindrical interior wall that is preferably vertically mounted or at least mounted with a vertically downward tangent. The vortex tube (or each vortex tube if more than one is employed) has an inlet arranged so that wet gas flowing therein tangentially intersects the interior wall of the vortex tube and flows around the interior wall to thereby create centrifugal force that is applied to the components, the centrifugal force serving to move the heavier component, that is, the liquid component, towards the wall of the vortex tube while the lighter component (gas) is forced towards the interior of the tube. In a typical vortex tube, the gas is withdrawn from an upper central vortex opening while the liquid component is withdrawn from a liquid outlet in the bottom portion of the tube.

This invention herein is a system and method employing a separator internal process apparatus in combination with a vortex tube or a "vortex tube cluster". In a vortex tube cluster, each tube receives an approximately equal portion of the incoming flow stream.

For additional background information relating to the general subject mater of this disclosure reference may be had to the following previously issued United States patents:

| U.S. Pat. No. | Inventor | Title |
|---|---|---|
| 3,930,816 | Miczek | Structure For A Gas and Liquid Contacting Chamber In A Gas Effluent Processing System |
| 4,838,906 | Kiselev | Contact-And-Separating Element |
| 6,576,029 | West | System For Separating An Entrained Liquid Component From A Gas Stream |
| 6,673,135 | West | System and Method Of Separating Entrained Immiscible Liquid Component Of An Inlet Stream |
| 6,709,500 | West | System For Separating Entrained Liquid From A Gas Stream Using A Sloped Vessel |
| 7,001,448 | West | System Employing A Vortex Finder Tube For Separating A Liquid Component From A Gas Stream |

SUMMARY OF THE INVENTION

The invention herein relates to an inlet device for separating immiscible components of a wet gas stream. By "inlet device" is meant a centrifugal separator for separating immiscible components of a wet gas stream.

A "wet gas stream" as used herein refers to any stream that is essentially gas but that carries with it a liquid component. As an example, natural gas that is recovered from underground formations in the earth and that is a substantial source of energy to modern civilization, inevitably includes some entrained liquids. These entrained liquids typically include water, hydrocarbons such as crude oil or crude oil having water mixed therewith. Wet gas streams can also include processed streams, such as encountered in the refining industry or in other forms of chemical manufacturing plants. Separating immiscible components of a wet gas stream can be accomplished with a centrifugal separator that includes an upright cylindrical vortex tube having an internal circumferential wall, having at the top a gas outlet opening therein, having a bottom providing a liquid outlet opening and having a wet gas stream inlet tangential to the internal wall surface.

The revolution vortex tube separator of this invention has a helical baffle secured to the vortex tube cylindrical wall interior surface. The helical baffle has an upper end that is below the vortex tube top above the inlet. A lower end of the helical baffle is spaced above the vortex tube bottom.

The function of the helical baffle is to assist in maintaining the downwardly spiraled centrifugal rotation of the wet gas stream within the interior of the vortex tube. While eliminating free-falling of liquid from the inlet manifold level to the liquid interface and ensures a smooth entrance angle of the separated liquid into the liquid interface. In some instances the lower end of the vortex tube may extend into a pool of liquid within a vessel. In these instances the helical baffle may terminate approximately above or below the liquid level.

A plurality of spaced apart vertical outlet fins are attached to and extend radially from the internal wall surface of the vortex tube. The outlet fins are positioned adjacent the bottom of the vortex tube and below the bottom end of the helical baffle.

In another embodiment the invention is in the form of an inlet device for separating immiscible components of a wet gas stream that includes a closed vessel having a wet gas stream inlet, an upper gas outlet, at least one lower liquid outlet and having provision for maintaining a liquid level therein. A plurality of upright cylindrical vortex tubes are positioned within the closed vessel. Each vortex tube has an internal cylindrical wall surface and each vortex tube has a top with a gas outlet opening therein, a bottom providing a liquid outlet opening and each vortex tube has a wet gas stream in the sidewall thereof tangential to the internal wall surface. The inlet is spaced below the top. Each vortex tube has a helical baffle secured to the vortex tube internal wall surface, the helical baffle extending from below the vortex tube top above the inlet. The lower end of the helical baffle is spaced above the vortex tube bottom.

Each vortex tube has, immediately above the bottom liquid outlet opening a plurality of spaced apart vertical outlet fins affixed to and extending radially from the vortex tube internal wall surface. Each outlet fin has a top end spaced below the helical baffle lower end.

A horizontal inlet tube is formed within the vessel and is connected at an inlet end to the vessel wet gas stream inlet and has a separate sidewall outlet opening for each of the vortex tubes.

The invention herein may be practiced in vessels having various shapes and orientations and liquid extracted from a wet gas stream may be treated within the vessel by the use of perforated plates, packing coalescence elements, electrical fields and so forth. However, the invention herein is not related to any specific ancillary equipment employed within a vessel.

The vortex tube gas/liquids separator of this invention may be installed inside a separator vessel with a manifold that is a horizontal extension of the inlet nozzle. Vortex tubes are preferably arranged in pairs and vertically positioned on either side of the manifold. Each vortex tube scoops off a portion of the fluid flow from the inlet stream. The intent is that all vortex tubes will receive an equal portion and make-up of the process stream.

The inlet stream enters each vortex tube tangentially, initiating rotation within the tubes. The swirl inside the vortex tubes creates an artificial high-gravity field by centrifugal force. Liquid migrates toward the tube wall where it drains downward and out of the tube through a peripheral gap at the bottom. Gas collects in the center of the spin, creating a vortex, then exits through the top of the tube. The lower end of each tube is submerged in standing liquid phase of the separator. This submergence maintains the level of the vortex interface inside the tube. The liquid level in the vessel is controlled in the same manner as it is in any conventional gas/liquids separator.

Utilizing the inlet momentum to generate high G-forces, this device promotes rapid, compact primary separation. Furthermore, the degree of separation is more thorough than from other inlet devices.

The vortex tube is applicable to a wide range of gas-liquid ratios. Unlike many cyclone devices, the revolution vortex tube of this invention is well suited to applications characterized by high liquid loading such as crude oil production applications, as well as to higher gas/oil ratio applications. The revolution vortex tube can be installed in both vertical and horizontal separators of all sizes. It can separate liquids ranging from light condensate to medium-heavy crude oil, and produced brines.

The high-gravity field inside the vortex tubes promotes separation of fluid phases. Rapid primary separation of entrained mist from the gas phase, and more thorough degassing of the liquid phases are also achieved. However, the greatest benefit is its destruction of foam. The vortex tube causes a rapid decay of foam into its gas and liquid components. Other types of inlet devices, at best, seek to minimize the further aggravation of the already existing foam problem in the momentum dissipation function. With them, the inlet momentum is considered an enemy of separation. Conversely, the vortex tube utilizes the inlet momentum to promote abatement of foam.

Since the vortex tube described herein is very effective in destroying foam, it minimizes or eliminates the influence of foam in the design of separators. Furthermore, the improved primary separation allows reduction of the downstream process volume required for demisting of the gas phase and degassing the liquid phases. The result is that a higher separator capacity is achieved per cubic foot of separator volume. The improvement is very significant, from 20% to 500%, depending on foam severity. The greatest benefit can be expected in high-liquid-flow rate separators.

There are two ways the overall benefit of the vortex tube of this invention can be utilized. First, in new separator applications a vessel can be designed to reduce process volume requirements. In this way a separator can be reduced in size, weight and cost. This is especially attractive in offshore applications where the cost of floor space is so high. The second way is to exploit the advantage of the vortex tube by retrofitting it into existing separators for the purpose of increasing their capacity, reducing or eliminating their dependence on chemical defoamers, or improving their performance. In this way separation facilities choked by foam can be de-bottlenecked and much higher throughput achieved. Since vortex tube components are essentially tubular they can conveniently be taken through a manway and assembled inside an existing vessel.

The following four problems related to the performance of vortex tubes are addressed in the present invention:

1. The free-fall of liquid from the inlet manifold to the gas-liquid interface surface;
2. Control in the vortex tail which must remain inside the vortex tube;
3. Gas carry-under which hinders separation performance; and
4. Liquid carry-over which may create excess liquids in the gas outlet.

A problem with existing vortex tubes is that the liquid free-falls from the inlet manifold level all the way to the liquid interface in the tube. When a vortex tube does not have any internals installed on the tube walls, it has been learned that the liquid will make approximately one complete turn on the tube walls and then plunge vertically down into the liquid interface. In other words, the liquid is free-falling from the inlet manifold level all the way to the liquid interface level in the tube.

It has been learned that helical baffles secured to the vortex tube internal wall surfaces can substantially eliminate liquid free-fall.

Due to the fluid rotation within a vortex tube induced by the tangential inlet, a vortex is formed below the liquid interface. Gas present above the liquid interface is re-entrained into the vortex by the high-velocity liquid stream plunging from the tube walls. The vortex must be contained inside the vortex tube. One option is to provide a solid baffle underneath the vortex tube to control the exit liquid velocity and to prevent the tail end of the vortex from escaping the vortex tube.

Gas bubbles escaping from the vortex tube represent the so called gas carry-under. In designing and operating a vortex tube, an objective is to mitigate as much as possible the gas carry-under. Gas bubbles which escape from the vortex tube generate foam above the gas-liquid interface that can choke the separator even if the foam was already destroyed in the vortex tube due to high G-forces. The foam can be recreated outside the vortex tube due to gas carry-under. Gas exiting the bottom of the vortex tube may also attach to free water droplets and float them in the oil, thus reducing the separation performance of the separator.

The liquid droplets which are not separated by the vortex tube will be carried over the top outlet of the tube. This un-captured liquid represents liquid carry-over. Typically, a separator is equipped with an internal feature to demist the gas phase. The gas phase leaving a separator should be free of any liquids in order to protect downstream equipment, such as compressors which can not tolerate any liquids.

The improved vortex tube of this invention employs two spiral rings or helical baffles. A preferred pitch angle (declination angle) from a horizontal plane of the spiral ring has been determined to be 15 degrees, however the spiral ring can be designed with a pitch angle from 1 degree to 45 degrees. The spiral rings extend upward above the inlet manifold and downward all the way to the liquid interface of the vortex tube.

A preferred practice is to use a cluster of vertical vortex tubes, half of them installed on one side of the inlet manifold and half of the tubes installed on the other side of the inlet manifold. In half of the vortex tubes the fluids are rotated clockwise and in the other half of the vortex tubes the fluids are rotated counter-clockwise. The spiral rings must rotate clockwise or counter-clockwise downward in the same way as the fluid is rotating into the tube.

Tests of the improved vortex tube have shown:
1. Two spiral rings (helical baffles) performed better than one spiral ring for the same pitch angle;
2. Helical baffles with a 15 degree pitch angle performed better than helical baffles with a 45 degree pitch angle; and
3. The helical baffles should be extended from above the vortex tube inlet downward to near the liquid interface.

The preferred configuration which takes into account these findings has two spiral rings each with a 15 degrees pitch angle and are extended down to or preferably near the liquid interface.

At the top of the improved vortex tube is an orifice with a 2" downward lip. Any small amount of liquid traveling upwardly on the tube wall will be trapped into the annulus space between the tube shell and the downward lip of the central orifice. The orifice should be designed with a low pressure drop across it. The pressure drop across the orifice is transmitted downward to the liquid interface. As a result, the liquid interface is pushed down, increasing the chances of gas blow-out from the bottom of the tube. Liquid submergence has been found to be a very important factor in controlling the vortex inside the vortex tube.

The vortex tube of this invention is provided with an extension above the inlet manifold level. This extension is approximately a couple of inches long and is sandwiched between the initial gas and liquid entrance of the vortex tube and the orifice with the downward lip. The top section of the improved vortex tube works as a vertical pipe separator and represents an additional stage for gas-liquid separation. By providing the vortex tube with this extension, liquid carry-over is substantially reduced.

On the bottom of the improved vortex tube a number of vertical fins are attached to the tube walls. Testing has been performed to determine the optimum number of vertical fins and also the dimensions of the fins. An optimized vortex tube configuration has about eight (8) vertical fins. The maximum angle between any two consecutive vertical fins in the horizontal plane is 45 degrees. During testing the tail end of the vortex always stopped above the vertical fins. The rotational motion of the liquid at the bottom of the vortex tube is greatly reduced by the vertical fins.

Underneath the vortex tube a horizontal exit plate may be installed in order to control the exit velocity of the liquid. The pressure drop experienced by the liquid leaving the vortex tube due to a solid plate combined with the vertical fins attached to the tube walls play a significant role in vortex control, however, the use of an exit plate is optional.

Some of the advantages of the improved vortex tube of this invention are:

1. The spin of the heavy phase (liquid phase) on the tube walls is sustained to enhance degassing of the liquid phase (separation of gas from liquid).

2. In a three-phase application (oil-water-gas) the helical baffles provide improved liquid-liquid separation on the vortex tube walls or improve the coalescing of small water droplets in the oil and oil droplets in the water. This can reduce the oil and water retention time in a separator, which eventually translates into a smaller section of the quiescent zone downstream of the vortex tube.

3. Free-fall conditions are prevented because of the helical baffles attached to the tube walls in the upper section of the vortex tube.

4. A smooth or smoother transfer of the spinning liquid from the helical baffles into the interface is achieved. The liquid entering under a 15 degree angle controlled by the helical baffles will re-entrain smaller amount of gas compared with a plunging jet when the angle of impact is 90 degrees.

5. Control of the vortex is improved by using vertical fins attached to the tube walls at the bottom of vortex tube. Better control of the vortex leads to a reduction in the gas carry-under and improved foam reduction.

6. An orifice with a downward lip reduces the liquid carry-over from the tube. Better control of the liquid carry-over from the vortex tube leads to a reduced liquid load on other internals of separator and increases liquid handling capacity of the separator vessel.

7. The new revolution vortex tube design has no moving parts and does not require any maintenance or special service during operation.

8. Internals installed on the vortex tube walls are not prone to get plugged with solids or sand that would affect the circulation of fluids.

9. When the internal parts of the improved vortex tube are manufactured out of steel and welded to the tube walls the completed vortex tube is robust enough to withstand normal impact forces and fluid weights.

A better understanding of the invention will be obtained from the following detailed description of the preferred embodiments taken in conjunction with the drawings and the attached claims.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings.

FIG. 9 is a horizontal cross-sectional view of an inlet tube feeding eight vertical vortex tubes arranged in four pairs. In FIG. 9 the cross-sectional area of the inlet tube is reduced successively between pairs of vortex tubes.

DETAILED DESCRIPTION OF A PREFERRED EMBODIMENTS

It is to be understood that the invention that is now to be described is not limited in its application to the details of the construction and arrangement of the parts illustrated in the accompanying drawings. The invention is capable of other embodiments and of being practiced or carried out in a variety of ways. The phraseology and terminology employed herein are for purposes of description and not limitation.

Elements shown by the drawings are identified by the following numbers:

| | |
|---|---|
| 10 | Vortex tube |
| 12 | Top end plate |
| 14 | Bottom end |
| 16 | Wet gas stream inlet |
| 18 | Inlet tube |
| 20 | Gas outlet |
| 22 | Exit plate |
| 23 | Short posts |
| 24 | Liquid outlet |
| 26 | Interior wall |
| 28 | First helical baffle |
| 30 | Second helical baffle |
| 32 | Top end of helical baffle |
| 34 | Bottom end of helical baffles |
| 36 | Outer edge |
| 38 | Circumferential lip |
| 40 | Lower end of 38 |
| 42 | Upper liquid level, hydrocarbon |
| 44 | Lower liquid level, water |
| 46 | Vertical outlet fins |
| 48 | Vessel |
| 50 | Flange |
| 52 | Vessel gas outlet |
| 54 | Water outlet |
| 56 | Oil outlet |
| 58 A, B | Flow splitter walls |
| 60 | Beginning point |
| 62 | End wall |
| 64 | Vent openings |
| 66 A, B, C, D | Varying diameter inlet tubes |

Figure 1:
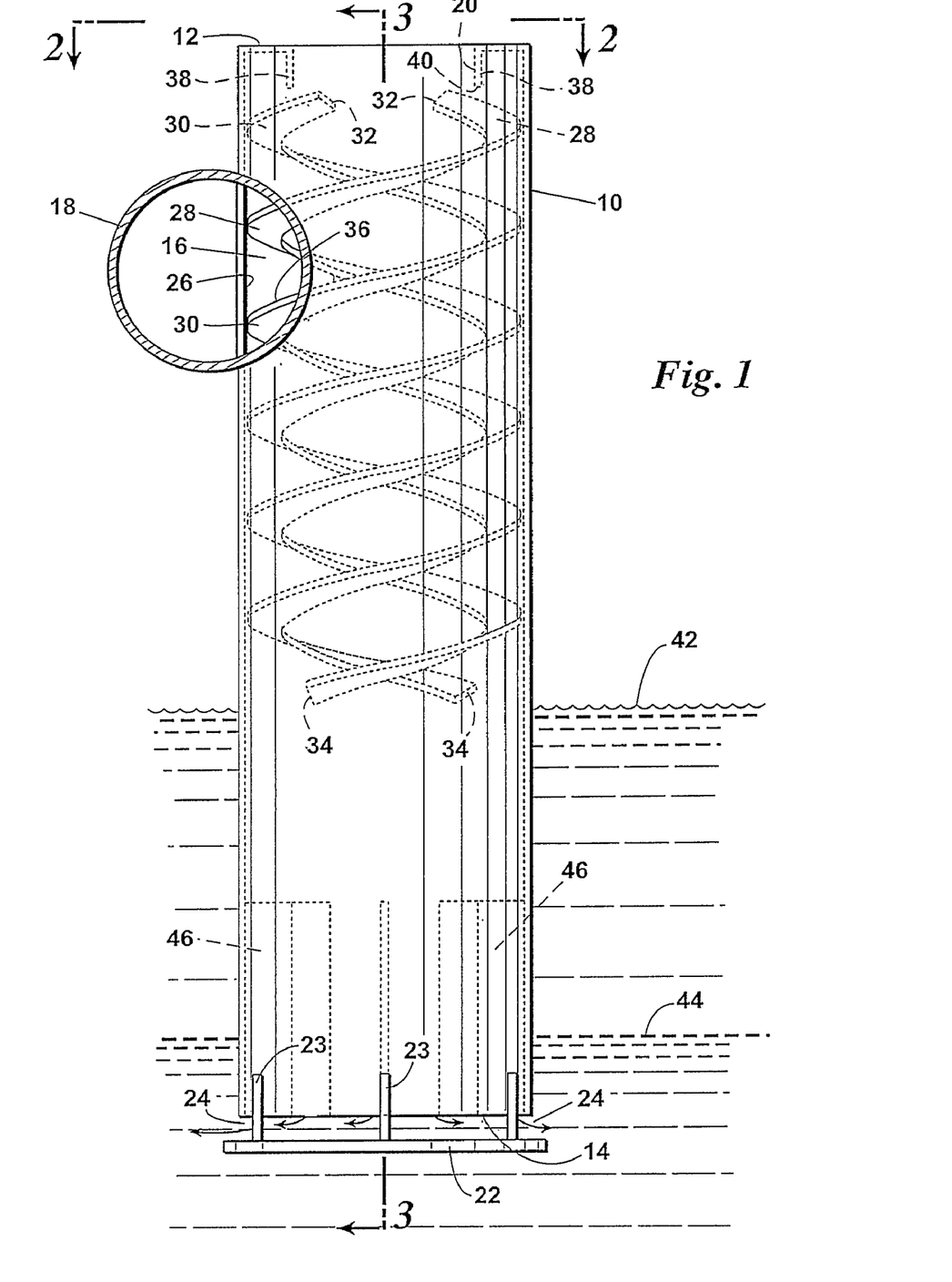
FIG. 1 is a revolution vortex tube gas/liquid separator of this invention. The exterior of the vortex tube as illustrated extends vertically downwardly into a two-phase pool of liquid, that is, an upper phase representing a lighter component such as oil and a lower phase representing a heavier component such as water. An inlet pipe by which a wet gas stream is introduced into the vortex tube is shown in cross-section.
Figure 2:
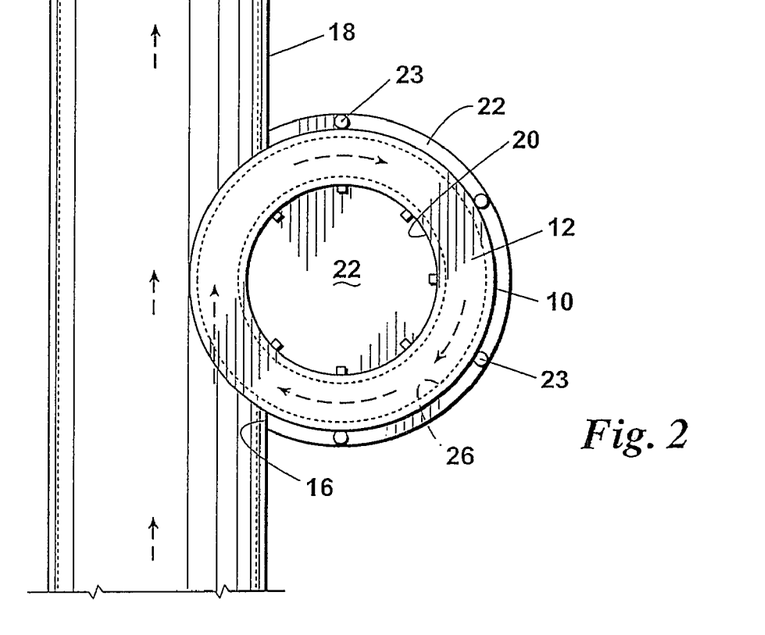
FIG. 2 is a top plan view of a vortex tube with the inlet as shown along the line 2-2 of FIG. 1.
Figure 3:
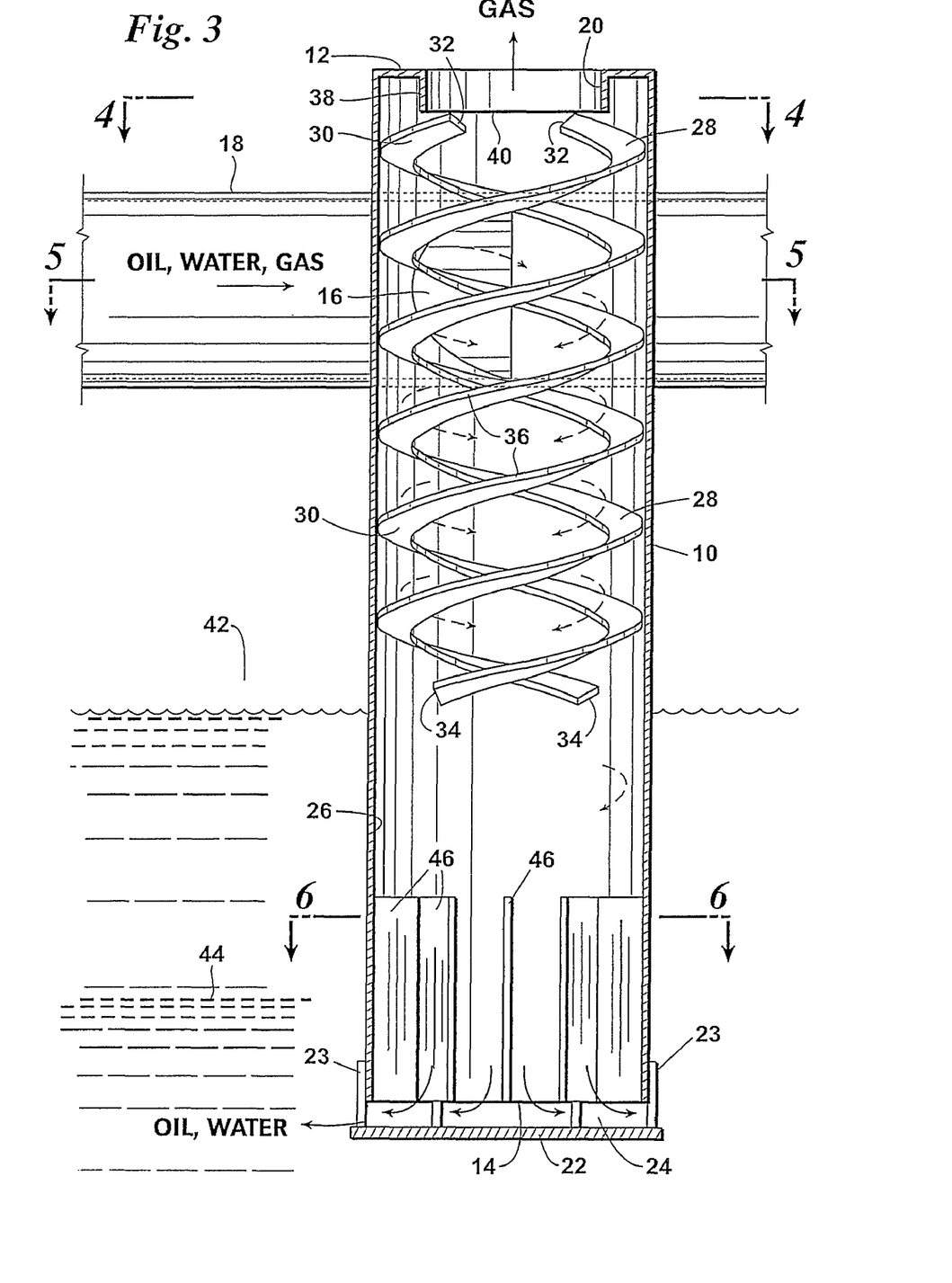
FIG. 3 is an elevational cross-sectional view of the vortex tube as taken along the line 3-3 of FIG. 1.
Figure 4:
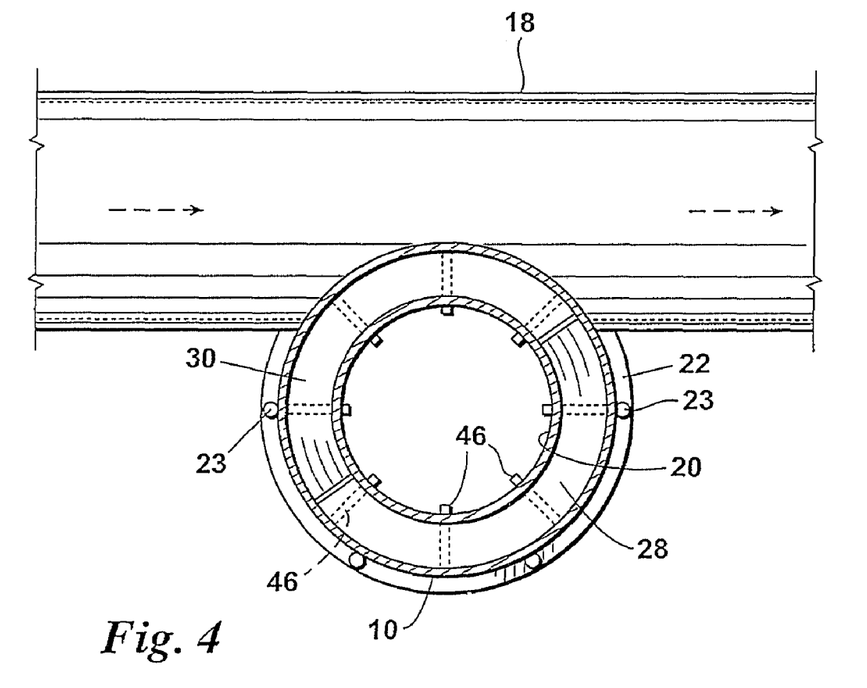
FIG. 4 is a horizontal cross-sectional view of the vortex tube with a fragment of the horizontal inlet tube, as taken along the line 4-4 of FIG. 3.
Figure 5:
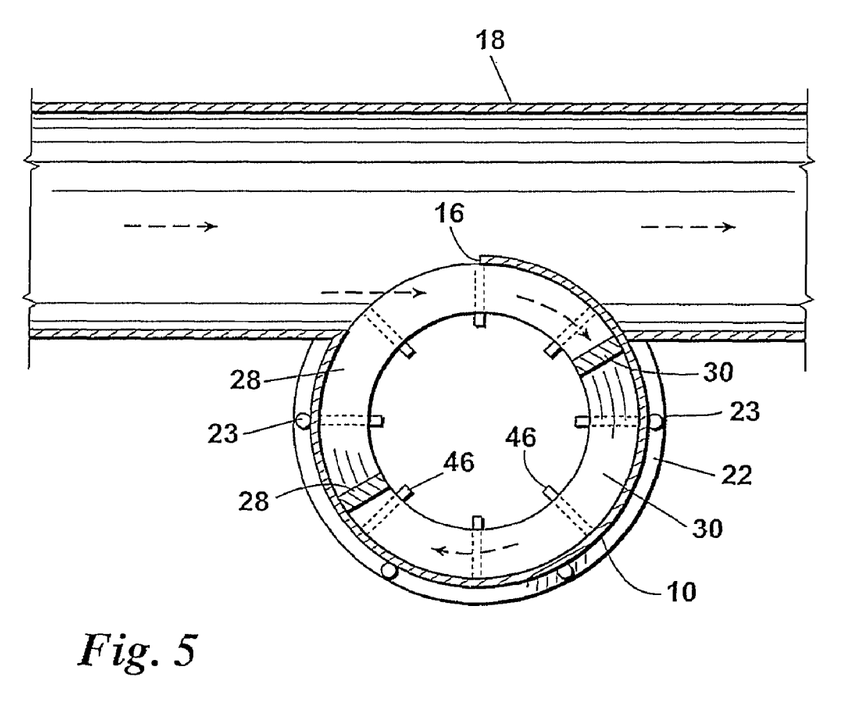
FIG. 5 is a view like FIG. 4 except taken along the line 5-5 of FIG. 3.

Referring first to FIG. 1, an external vertical view is shown of a rotation vortex tube gas/liquids separator of this invention. In FIG. 1 a representative vortex tube 10 is shown vertically positioned, having a top end plate 12 and a bottom end 14. Intermediate top end plate 12 and bottom end 14, and positioned closer to top end plate 12, is a wet gas stream inlet 16 that is in communication with the interior of inlet tube 18. Inlet tube 18 is typically horizontal and conveys to the vertical vortex tube 10 a stream of wet gas. By the term "wet gas" means a stream that is essentially gas but that includes, entrained with the gas, liquids and perhaps solids, such as sand, dirt, rust, etc. Liquids can typically be water, crude oil or any other liquid that is immiscible with the gas stream. The function of vortex tube 10 is to separate from the gas stream the entrained liquids. The top end plate 12 of vortex tube 10 has, as shown in FIG. 2, a gas outlet opening 20. As shown in FIGS. 1 and 2 the top end plate 12 is an annular plate in which the gas outlet opening 20 is concentric with the plate and therefore opening 20 is concentric with vortex tube 10.

The bottom 14 of vortex tube 10 is open and provides the exit from the vortex tube of liquids extracted within the tube. As an optional element, though by no means mandatory, there is shown in FIG. 1 a bottom exit plate 22 held by short posts 23. Exit plate 22 is spaced from tube circumferential bottom 14 providing a circumferential liquid outlet 24. Exit plate 22 is typically of larger diameter than the outside diameter of vortex tube 10.

Gas flows under pressure through inlet tube 18 into the interior of vortex tube 10. The gas stream impinges against the interior circumferential wall 26 of vortex tube 10. The gas flows with velocity against the interior's cylindrical wall 26 and accordingly swirls against the interior wall. The swirling gas creates a centrifugal vortex within the interior of vortex tube 10, creating a high centrifugal force so that heavier components, including any entrained liquid components, tend to flow against the interior wall 26. The lighter components, that is, the gas components of the inlet stream, migrate towards the center of vortex tube 10 and pass out through the upper gas outlet 20.

To maintain effectiveness of the circumferential action of the wet gas stream within tube 10 it is important that the gas velocity stays high in the area adjacent interior wall 26. To augment this circumferential action the improved vortex tube of this invention has positioned therein a pair of helical baffles 28 and 30. Helical baffles 28 and 30 are interleaved, that is, remain parallel to each other from the helical baffle top end 32 to the bottom end 34. Each helical baffle is formed of a relatively thin, flat strip that may be formed of metal to give strength and rigidity although the strip could be non-metal. Each of the helical baffle strips 28 and 30 has an outer edge 36 that is contiguous to the vortex tube interior wall 26. The baffles are secured to the interior wall 26 of the tube such as by welding.

An important aspect of the helical baffles 28 and 30 of the improved vortex tube of this invention is that the top end 32 of each is positioned above the wet gas stream inlet 16. In this way the wet gas stream as it enters into the interior of tube 10 is induced to continue to swirl against the tube interior wall 26 and to move in a downward direction. Each of the helical baffles 28 and 30 has an angle relative to a horizontal plane of tube 10 of between 1° and 45°. However, it has been learned that with the use of two, interleaved helical baffles an angle of about 15° achieves superior results. By this is meant that with a helical baffle angle of 15° the swirling action of the wet gas stream within tube 10 is maintained for an extended duration giving the heavier components, that is the liquid and/or any entrained solid components, ample opportunity to migrate radially outwardly towards the interior wall of the tube while the lighter, that is the gas components, migrate inwardly towards the tube axis. The inward migration of the lighter components results in the pressure build up in the gas stream causing the gas, having the liquid and solid components essentially separated therefrom to move upwardly and outwardly through the gas outlet 20.

As has been previously stated, at the top end of vortex tube 10 is a toroidal top end plate 12 that has a central opening therein forming the gas outlet 20. An important innovative aspect of the improved revolution vortex tube of this invention is the provision of a downwardly extending circumferential lip 38 that extends concentrically and downwardly within the upper end of vortex tube 10 and that defines the gas outlet 20. This downwardly extending lip 38 serves to intercept any liquids that accumulate against the tube interior wall 26 and that would tend to move upwardly and restrain any liquid movement out through the gas outlet opening 20. The upper end 32 of each of the helical baffles 28, 30 is preferably just below the lower end 40 of circumferential lip 38.

While the vortex tube 10 can function to centrifugally separate entrained liquids and physical objects from a wet gas stream in a preferred arrangement the vortex tube is used in a separator that maintains at least one liquid level therein. Thus, in FIG. 1 there is shown a liquid level 42 spaced a distance above the vortex tube lower end 14. If the entrained gas stream has essentially only one important liquid component then the liquid level of that component is at 42 as illustrated. The improved vortex tube separator of this invention is particularly applicable for extracting liquids from a natural gas stream in which the liquid component typically is two phase, that is, a water phase and a petroleum phase. That is, natural gas, as it emanates from subterranean formations, typically has entrained therein a liquid that is a mixture of water and hydrocarbons or petroleum components. The primary function of vortex tube 10 is to separate the liquid components, whether water or hydrocarbon from the gas stream and to provide a substantially dry gas stream that passes out through the gas opening 20. However, the vortex tube is also beneficial in augmenting the separation of the liquid components into a heavier and lighter components and particularly; when the invention herein is used in the petroleum industry to separate water and liquid components from the liquid outlet. In this case the liquid in which the lower end of tube 10 is submerged will have two phases, that is, a lighter phase and below that a heavier phase which, in the petroleum industry, would be an upper hydrocarbon phase and a lower water phase. For this reason the liquid level 42 is typically a hydrocarbon level while the heavier water component has a lower, second water level 44. Both the petroleum component represented by upper level 42 and the water component represented by lower level 44 pass commingle to the vortex tube liquid outlet 24. The action of the vortex tube tends to separate these components so that the liquid component is in a condition to be more easily separated, such as by the action of gravity into a hydrocarbon component and a water component.

The wet gas stream entering the vortex tube 10 from inlet tube 18 swirls and by centrifugal action within the tube separates the heavier and lighter components and specifically separates the entrained liquid from the gas components. The lighter gas components migrate towards the center and out through the upper gas outlet 20 while the liquid components move downwardly and pass out through liquid outlet 24 at the bottom of the tube. As the liquid components approach the tube bottom end 14 it is advantageous if the swirling action that produces centrifugal separation within the upper portion of the tube is diminished as the liquid component passes out past the tube bottom end 14. For this reason there is positioned within the interior of tube 10 at the bottom end 14 a plurality of spaced apart vertical outlet fins 46. Each outlet fin 46 is a rectangular relatively thin metal plate that is secured to the tube internal wall 26, such as by welding. Each vertical outlet fin 46 is in a plane of the cylindrical axis of tube 10. The lower end 34 of each of the helical baffles 28 and 30 terminate above the top ends of the vertical outlet fins 46 so that the swirling action which is preserved by the helical baffles as the wet gas stream moves downwardly within the tube can be attenuated by the outlet fins. A certain minimum distance is required between the ends of helical baffles 34 and top ends of vertical outlet fins 46 to allow the vortex to fully develop. In this area no internals are recommended. Thereby the liquid passing out the tube bottom end 14 is more nearly a laminar flow so that any residuary swirling action of the separated liquid passing out the bottom end 14 of the tube does not tend to induce further mixing of the liquid components. More specifically, the vertical outlet fins 46 help insure that a gas vortex that is developed within the interior of the vortex tube does not extend past the bottom end 14 thereof but is contained entirely within the interior of the vortex tube 10 so that only the liquid components pass outwardly at the bottom end 14 while the gas components are all directed towards the interior of the swirling wet gas stream and pass out through the upper gas outlet 20.

Figures 6, 8:
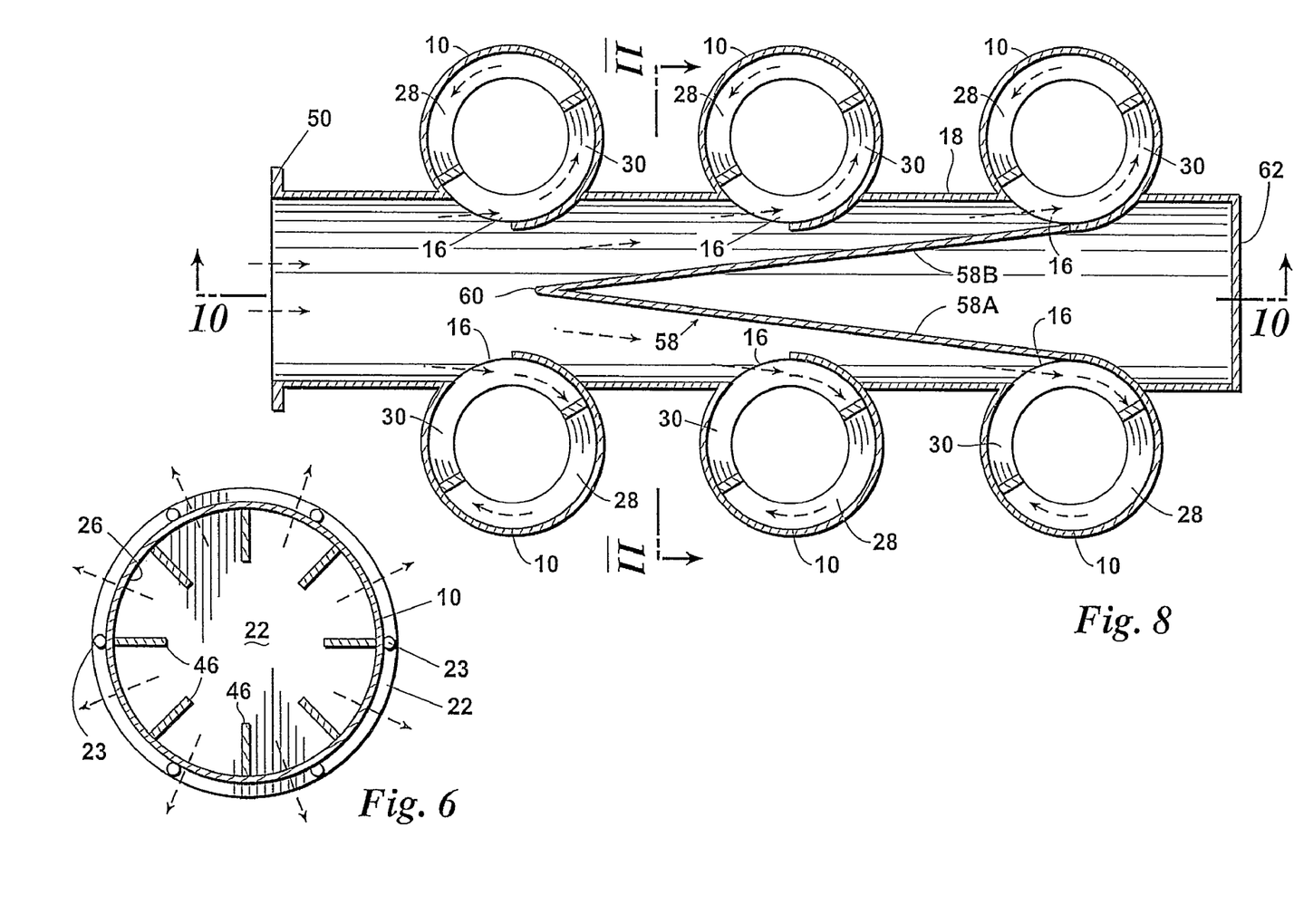
FIG. 6 is a cross-sectional view of a lower end portion of the vortex tube taken along the line 6-6 of FIG. 3.
FIG. 8 is a horizontal cross-sectional view of an inlet tube that feeds six vertical vortex tubes, the vortex tubes being arranged in three pairs. This vortex tube arrangement is an example of that shown in FIG. 7.
Figure 7:
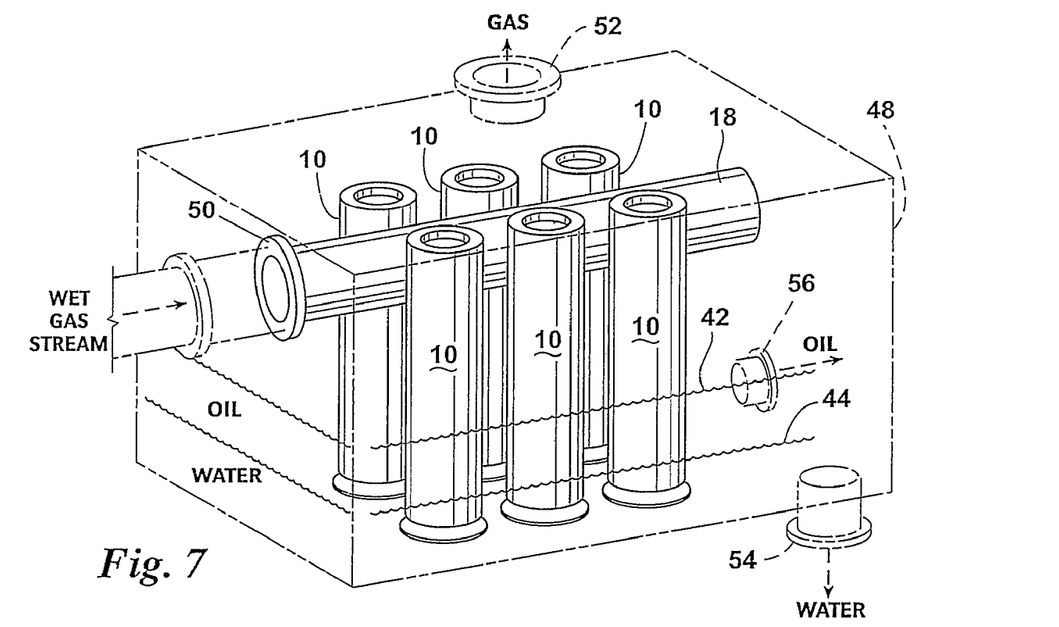
FIG. 7 is a diagrammatic view showing a rectangular separator vessel in phantom outline and showing, within the vessel, a separation system including six vortex tubes affixed to a single inlet tube.

A practical use of the centrifugal vortex tube separator as illustrated in FIGS. 1 through 6 is illustrated in FIG. 7. In FIG. 7 six vortex tubes 10 having the components and characteristics of the vortex tubes illustrated and described with respect to FIGS. 1 through 6 are mounted as a unit within a vessel 48 which is illustrated as a rectangular vessel although the shape of the vessel would be irrelevant. A single inlet tube 18 extends to a flange 50 that is in an end wall of vessel 48 and by which a wet gas stream can be conducted into the interior of vessel 48 for separation of the components thereof. Within vessel 48 the action of the vortex tube 10 functions to separate gas from the components entrained therein. The gas accumulating in the upper portion of vessel 48 exits the vessel through vessel gas outlet opening 52. The liquid components accumulate in the lower portion of vessel 48 and establish the upper hydrocarbon liquid level 42 and the lower water liquid level 44 as has been described with reference to FIG. 1. The water component can be withdrawn from vessel 48 through water outlet 54 employing a liquid level control (not shown) whereas the hydrocarbon or oil component can be withdrawn from vessel 48 through oil outlet 56 which would also employ some form of liquid level control which is not shown in FIG. 7 but is common in the petroleum industry.

Thus FIG. 7 shows how a plurality of vortex tubes 10 are arranged as a unit to separate the entrained liquid components from a wet gas stream in a process vessel.

Figure 10:
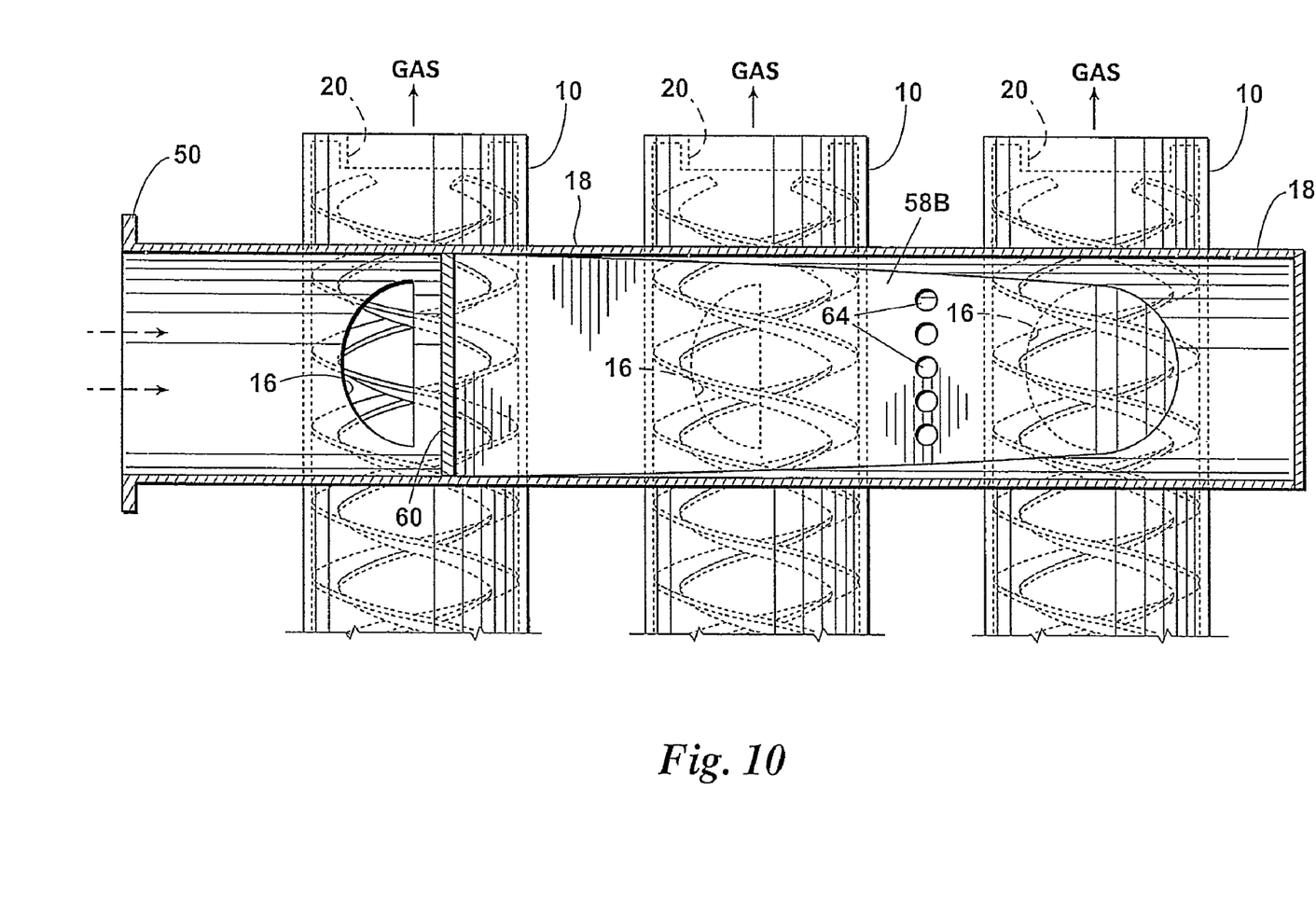
FIG. 10 is an elevational cross-sectional view taken along the line 10-10 of FIG. 8 and shows the inlet tube in cross-section and showing the top portions of three vertically mounted vortex tubes.
Figure 11:
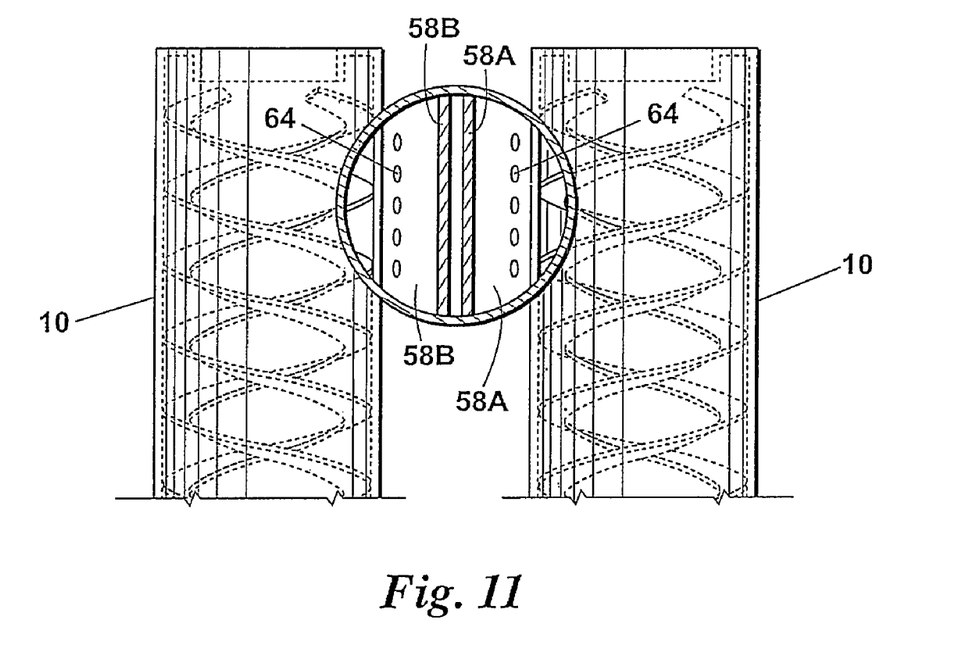
FIG. 11 is an elevational view taken along the line 11-11 of FIG. 8 showing fragmentary views of the upper portion of one pair of vortex tubes with the inlet tube shown in cross-section.

FIGS. 8, 10 and 11 show details of the arrangement of FIG. 7 wherein six vortex tubes are employed as a unit. FIG. 8 is a horizontal cross-sectional view taken along the center line of the inlet tube 18 that feeds three pairs of vortex tubes 10. FIG. 8 shows as an additional component to the assembly, that is a flow splitter 58. The flow splitter as seen in FIG. 8 is formed by a first wall 58A and an opposed second wall 58B, the walls meeting at a beginning point 60. The function of flow splitter 58 is to more evenly distribute the inlet flow of the wet gas stream passing into the inlet end of tube 18 so that it enters more evenly into the six vortex tubes 10. Each of the vortex tubes 10 is substantially identical, as illustrated in FIGS. 1 through 6. Inlet tube 18 is shown in FIG. 8 with an end wall 62 that provides an inactive space within the tube between the end wall 62 and the interior surfaces of the flow splitter walls 58A and 58B.

As seen in FIG. 8, the six vortex tubes 10 function as three pairs with the vortex tube on one side of inlet tube 18 circulating in a clockwise direction while the vortex tubes on the opposite side circulate in a counter-clockwise direction. This arrangement is necessary with the tubes located on opposite sides from each other and the tubes function exactly the same way regardless of the direction of fluid rotation. The pair of helical baffles in each of the vortex tubes 10 will be configured to augment the flow either clockwise or counter-clockwise depending on whether the helical baffles are on the inlet tube left or right hand side.

FIGS. 10 and 11 are cross-sectional views of FIG. 8 showing the relationship between the inlet tube and the multiple helical baffles and further, showing more details of the flow splitter 58 including flow splitter walls 58A and 58B.

As shown in FIGS. 10 and 11 the flow splitter walls 58A and 58B are each provided with vent openings 64 that communicate with the unused space within the interior of the inlet tube between the flow splitter walls and the end walls 62. These vent openings have no significant function in the operation of the vortex tube separator system except to equalize pressure on the opposed sides of flow splitter walls 58A and 58B to prevent the walls from being distorted by the pressure of the inlet gas stream.

Figure 9:
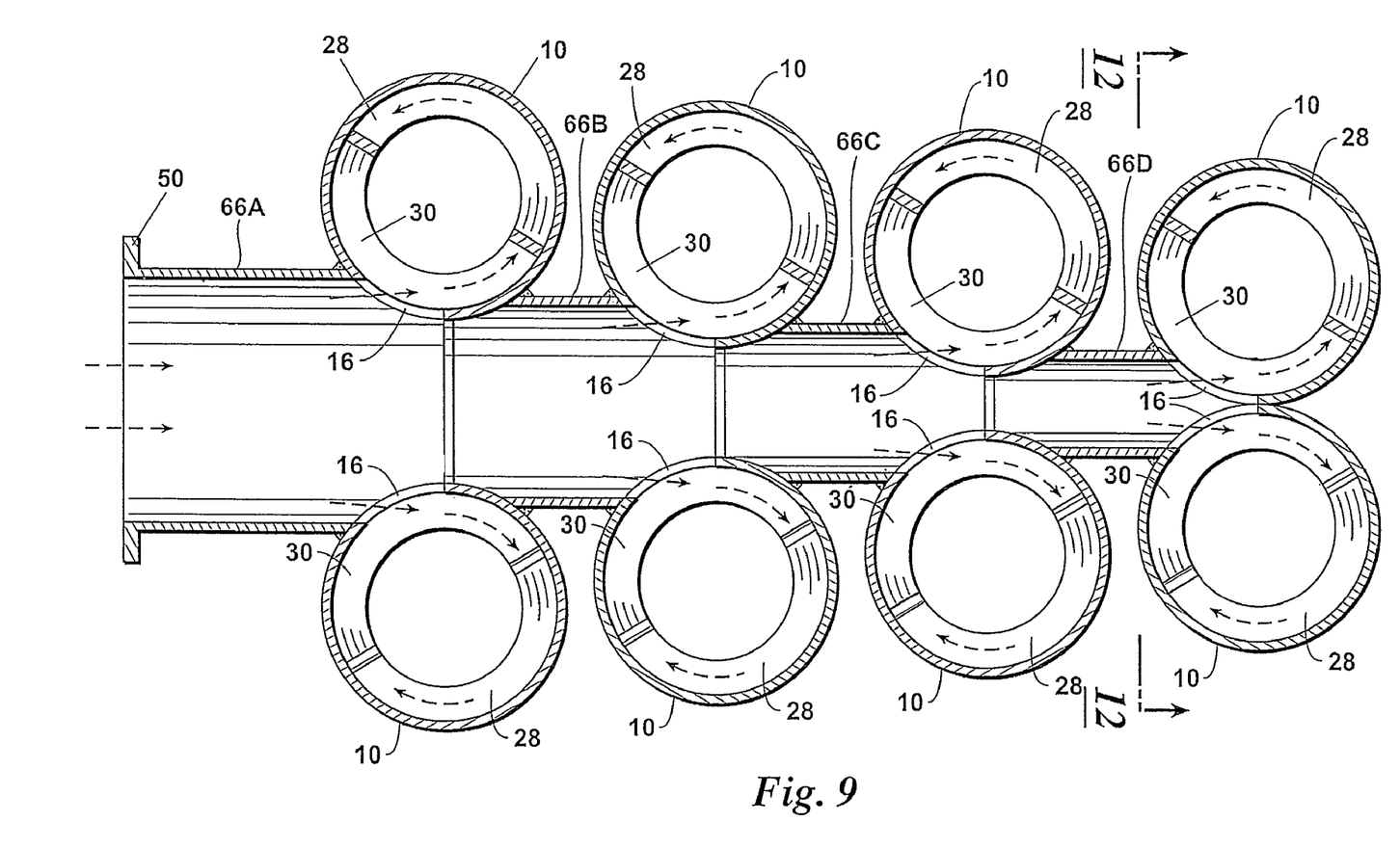
Figure 12:
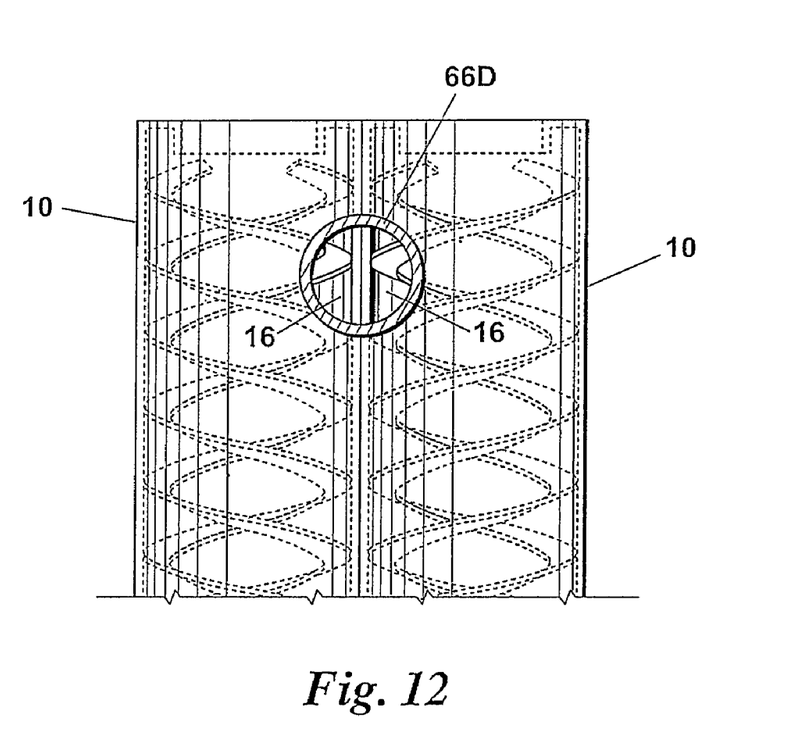
FIG. 12 is an elevational view taken along the line 12-12 of FIG. 9 showing a fragmentary elevational view of the final pair of vortex tubes in the assembly of FIG. 9.

FIGS. 9 and 12 show a slightly alternate embodiment of the invention. In these figures there is no change in the arrangement of the vortex tubes 10 but the inlet tube 18 is substantially changed. In all of the figures except FIGS. 9 and 12 the inlet tube 18 is shown to be of consistent diameter. In FIGS. 9 and 12 the inlet tube 18 varies in diameter and specifically varies in diameter between each adjacent pairs of vortex tubes. FIG. 9 shows the use of four pairs of vortex tubes, that is, eight vortex tubes, all of which have substantially been described. The difference in FIG. 9 is that the inlet tube is formed of four portions 66A, 66B, 66C and 66D. The portions of the inlet tube in sequence start with the larger diameter inlet tube 66A and between each succeeding pairs the diameter of the inlet tube reduces. This allows the vortex tubes of each pair to successfully move closer to each other although the vortex tube remain substantially identical. The use of succeeding reduced diameter lengths to form the vortex tube composed of 66A, 66B, 66C and 66D helps augment more equal distribution of the volume of the wet gas stream being distributed to each succeeding pairs of vortex tube and the use of the reduced diameter inlet tube portion 66A, 66B, 66C and 66D then accomplish essentially the same function as the flow splitter 58 of FIGS. 8, 10 and 11. The succeeding pairs of vortex tubes are equally spaced along the longitudinal axis of the inlet manifold as shown in FIGS. 8 and 9.

FIG. 12 is a cross-sectional view taken along the line 12-12 of FIG. 9 that shows the smallest diameter inlet tube 66D.

While vortex tubes have long been used in the industry, and particularly in the petroleum industry, for extracting liquids and entrained solid components from wet gas streams and also for separating heavier and lighter components from liquid streams, nevertheless the rotation vortex tube concepts as disclosed herein result in significant improved performance. Further it has been learned that for maximum performance the various features of the revolution vortex tube as described herein should be used in conjunction with each other.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. A centrifugal separator for separating immiscible components of a wet gas stream comprising:
    an upright cylindrical vortex tube having an internal wall surface, a top with a gas outlet opening therein, a bottom providing a liquid outlet opening and a wet gas stream inlet tangential to the internal wall surface, the inlet being spaced below the top;
    a helical baffle secured to said vortex tube internal wall surface and extending from below said top above said inlet to a lower end spaced above said vortex tube bottom; and
    a plurality of spaced apart vertical outlet fins affixed to and extending radially from said internal wall surface adjacent said bottom, each outlet fin having a top end spaced below said helical baffle lower end.

2. A centrifugal separator according to claim 1 wherein said helical baffle is in the form of two spaced apart spiral rings each with the same pitch angle of from 1 to 45 degrees from a horizontal plane.

3. A centrifugal separator according to claim 2 wherein said helical baffle spiral rings each have a pitch of about 15 to 30 degrees from a horizontal plane.

4. A centrifugal separator according to claim 1 configured for mounting within a liquid containing separator vessel having a liquid level therein and wherein said vortex tube liquid outlet opening is submerged in the liquid and wherein said helical baffle lower end is at the said liquid level in the vortex tube.

5. A centrifugal separator according to claim 1 having between 3 and 12 of said spaced apart outlet fins.

6. A centrifugal separator according to claim 1 where each said outlet fin is in a plane of a cylindrical axis of said cylindrical vortex tube.

7. A centrifugal separator according to claim 1 further comprising a short length reduced diameter downwardly extending tubular lip secured to said vortex tube top and concentric with and surrounding said gas outlet opening.

8. A centrifugal separator according to claim 7 wherein said tubular lip is a minimum of about 1 inch in length.

9. An inlet device for separating immiscible components of a wet gas stream comprising:
- a closed vessel having a wet gas stream inlet, an upper gas outlet, at least one, lower liquid outlet and having provision for maintaining a liquid level therein;
- a plurality of upright cylindrical vortex tubes each having an internal wall surface, a top with a gas outlet opening therein, a bottom providing a liquid outlet opening and a wet gas stream inlet tangential to the internal wall surface, the inlet being spaced below the top;
- each vortex tube having a helical baffle secured to said vortex tube internal wall surface and extending from below said top above said inlet to a lower end spaced above said vortex tube bottom;
- each vortex tube having a plurality of spaced apart vertical outlet fins affixed to and extending radially from said vortex tube internal wall surface adjacent said bottom, each outlet fin having a top end spaced below said helical baffle lower end; and
- a horizontal inlet tube within said vessel connected at an inlet end to said vessel wet gas stream inlet and having a separate sidewall outlet opening for each said vortex tube each sidewall outlet being in communication with a said vortex tube wet gas stream inlet.

10. An inlet device according to claim 9 wherein said helical baffle in each of said vortex tubes is in the form of two spaced apart spiral rings each with the same pitch angle from 1 to 45 degrees from a horizontal plane.

11. An inlet device according to claim 10 wherein said helical baffle spiral rings in each of said vortex tubes has a pitch of about 15 degrees from a horizontal plane.

12. An inlet device according to claim 9 wherein said open bottom of each said vortex tube is submerged below said liquid level and wherein said helical baffle lower end of each of said vortex tubes is at or slightly above said liquid level.

13. An inlet device according to claim 9 wherein each of said vortex tubes has between 3 and about 12 of said spaced apart vertical outlet fins.

14. An inlet device according to claim 9 where each said vertical outlet fin is in a plane of a cylindrical axis of said cylindrical vortex tube.

15. An inlet device according to claim 9 wherein each said vortex tube includes therein a short length reduced diameter downwardly extending tubular lip secured to each said vortex tube top and concentric with and surrounding said gas outlet opening.

16. An inlet device according to claim 9 wherein each said vortex tube has therein a tubular lip of at least about 1 inch in length.

17. An inlet device according to claim 9 wherein said horizontal inlet tube has spaced apart pairs of said sidewall outlet opening whereby said vortex tubes are positioned in pairs along opposed sides of said horizontal inlet tube.

18. An inlet device according to claim 17 in which said inlet tube is of substantially constant diameter for its full length.

19. An inlet device according to claim 18 including a V-shaped baffle that diverts the incoming wet gas stream towards said sidewall outlets.

20. An inlet device according to claim 17 wherein said horizontal inlet tube is tapered in width in the direction towards a final pair of vortex tubes.

21. An inlet device according to claim 20 wherein said inlet tube is tapered such that a final opposed pair of said vortex tubes are at least substantially contiguous as their exterior surfaces.

* * * * *

UNITED STATES PATENT AND TRADEMARK OFFICE
CERTIFICATE OF CORRECTION

| | | |
|---|---|---|
| PATENT NO. | : 7,931,719 B2 | Page 1 of 1 |
| APPLICATION NO. | : 11/949193 | |
| DATED | : April 26, 2011 | |
| INVENTOR(S) | : Sams et al. | |

It is certified that error appears in the above-identified patent and that said Letters Patent is hereby corrected as shown below:

In the Specifications:

Column 2, line 19, replace "mater" with "matter"

Column 2, line 63, replace "tube top above" with "tube top and above"

Column 3, line 26, replace "above" with "and above"

In the Claims:

Column 12, line 41 in Claim 1, replace "said top above" with "said top and above"

Column 13, line 17 in Claim 9, replace "said top above" with "said top and above"

Signed and Sealed this
Twenty-eighth Day of May, 2013

Teresa Stanek Rea
*Acting Director of the United States Patent and Trademark Office*